W. B. CUNNINGHAM.
AIRPLANE INDICATOR.
APPLICATION FILED AUG. 11, 1919.
1,399,423. Patented Dec. 6, 1921.
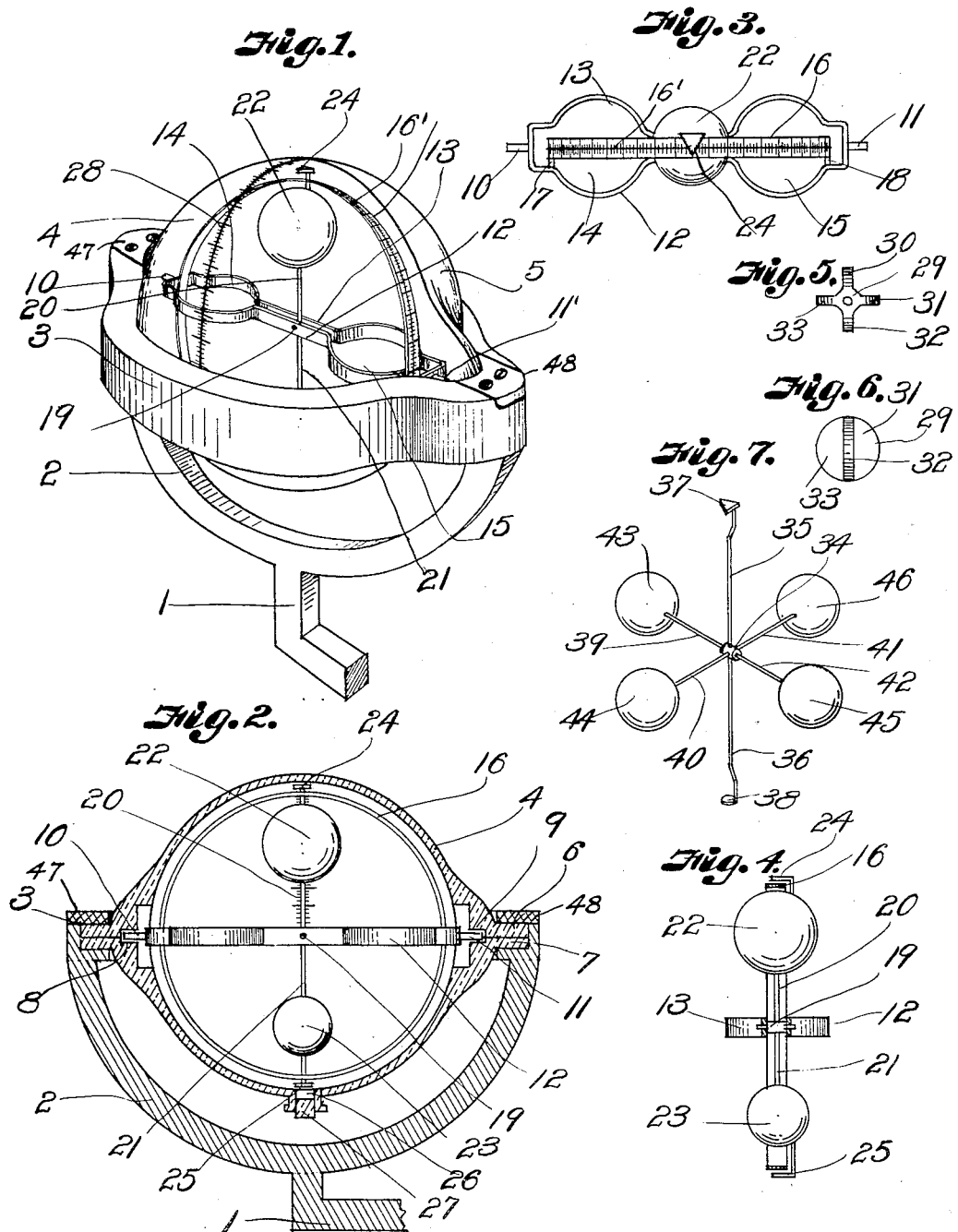
INVENTOR.
William B. Cunningham
BY
Arthur C. Brown
ATTORNEY.

UNITED STATES PATENT OFFICE.

WILLIAM B. CUNNINGHAM, OF KANSAS CITY, MISSOURI.

AIRPLANE-INDICATOR.

1,399,423.  Specification of Letters Patent.  Patented Dec. 6, 1921.

Application filed August 11, 1919. Serial No. 316,693.

*To all whom it may concern:*

Be it known that I, WILLIAM B. CUNNINGHAM, a citizen of the United States, residing at Kansas City, in the county of Jackson and State of Missouri, have invented certain new and useful Improvements in Airplane-Indicators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an indicator for airplanes, the object of the invention being to provide an efficient, durable and inexpensive indicator for determining the angularity of the plane when in motion.

In the drawings—

Figure 1 is a perspective view of a device constructed in accordance with my invention.

Fig. 2 is a vertical longitudinal sectional view through the same.

Fig. 3 is a top view of the indicating mechanism.

Fig. 4 is an end view of the indicating mechanism.

Fig. 5 is an end view of the resisting element operated by the balls shown in the preferred form.

Fig. 6 is a side view of the same.

Fig. 7 is a perspective view of the modified form of the indicating mechanism.

Referring now to the drawings by numerals of reference:

1 designates a bracket support provided with a substantially U-shaped bracket 2. The bracket 2 is provided with recessed bosses 3—3, which carries a globe in which the indicating mechanism is mounted. The globe preferably consists of semi-spherical members 4 and 5, the globe being bisected to permit the introduction of certain mechanism, to be referred to hereinafter, it being understood that after the mechanism is introduced into the sphere, the parts may be fused together and when the semi-spherical members are so connected the flanges 6 and 7 are recieved within the recesses of the bosses 3—3 as is best shown in Fig. 2.

The globe is provided with bearings 8 and 9 to receive the trunnions 10 and 11 of a transversely disposed frame consisting of the side bars 12 and 13 which are slightly bulged at their respective ends to provide loops 14 and 15, the globe being rotatable about an axis in line with the axis of the frame.

Carried by the frame is a continuous ring member 16 which is fastened to the frame by the brackets 17 and 18 and said ring may be calibrated in degrees from the top and bottom toward the frame as at 16', the degrees obviously being from 1 to 90, the quadrantal calibrations totaling 360 degrees, or the complete circle, as will be explained hereinafter. Pivoted to the frame is a balance bearing 19, which carries an arm, preferably consisting of a wire having a portion 20 above the frame and a portion 21 below the frame and each end of the arm carries a balancing member.

In Fig. 2 I have shown a hollow stabilizing sphere 22 connected to the member 20 and a smaller, weighted sphere 23 connected to the member 21 and the respective members 20 and 21 carry indicators or pointers 24 and 25 as will be clearly apparent by reference to Fig. 4. The globe is adapted to rotate about the axis of the frame consisting of the side bars 12 and 13, and the globe and frame together are adapted to swing or rotate about the axis of the pivot 19 for the arms 20 and 21. When the globe and frame are moving together about the axis of the pivot 19, they may scribe a complete circle. The pointers 24 and 25 are offset so that said pointers appear on the side of the ring 16 opposite to the brackets 17 and 18; therefore, it is possible for them to scribe a complete circle without contacting with said brackets.

The frame, the ring, the arm, the indicators and the corresponding mechanism are all assembled preparatory to being inserted in to the globe or sphere. When the indicating parts are put together, the two halves of the globe are brought together to inclose them and then the joints in the globe are sealed, preferably by fusing, so as to make a complete unitary structure. After this is done, a suitable non-freezable stabilizing liquid, such as alcohol, may be introduced into the finished globe through the opening 26 which may then be sealed off by a stopper 27 or any other suitable means, it being important that the globe be completely filled so that there will be no air bubbles present.

The top of the globe may be calibrated, as at 28, at right angles to the calibrations of the ring 16 and the calibrations will preferably be in degrees from 1 to 90 on opposite sides of the top of the globe, and each five degrees will preferably be indicated by a wider calibration so as to assist in reading. The calibrations, both on the ring and the globe, may be indicated by illuminous paint if desired, for assistance in night reading.

Instead of balls on the arm consisting of 20 and 21, I may provide a winged member 29, having plates 30, 31, 32, and 33, although I prefer the balls or spheres shown in Fig. 2.

When the device is set up as indicated in the preferred form, and the plane deviates from a horizontal position, the globe will swing about the axis of the frame so that the indicators 24 and 25 may indicate the degree of angle of inclination upon the calibrations 28 in one direction. If the angle of inclination is in another direction, the bracket 1, globe and frame will be tilted so that the ring 16 will partially rotate about its axis and since the weight 23 will maintain the arm in vertical position at all times, the degree of inclination will be indicated by the indicators 24 and 25 upon the ring. If there is a tip in both directions, this will be indicated both upon the ring and upon the globe so as to be visible to the operator.

The stability will be assured for the indicators by reason of the fact that the moving elements are submerged in a fluid offering considerable resistance to the balls, and since the upper ball is larger than the lower one, its size compensating for the difference between its weight and the weight of the ball 23, liability of vibration will be reduced to a minimum.

It will be apparent that the indicator 24 will not only indicate whether or not the plane is out of balance but will also indicate any angle at which the plane is inclined. For example, if the plane is inclined laterally and longitudinally, the indicator will appear in the quadrant at some point between the calibrations on the ring and the calibrations on the globe, and if the indicator 25 appears to be on top, the aviator will know that the machine is inverted.

In Fig. 7 I have shown a trunnion member 34 with wires 35 and 36, carrying the indicators 37 and 38 and provided with outstanding arms 39, 40, 41, and 42, carrying balls 43, 44, 45, and 46, this structure being substituted for that inclosed in globe in Figs. 1 and 2. It is to be understood, of course, that the balls 43 and 46 inclusive are to be exhausted bulbs so that the pressure of the liquid will cause them to remain in position.

The flanges 6 and 7 of the globe may be introduced into the recesses of the bosses 3—3, after which cover plates 47 and 48 may be fastened in place so that the flanges will be held in place. The particular means of mounting in the frame 2, however, is not important as other means may be provided if desired.

What I claim and desire to secure by Letters-Patent is:

1. In a balance indicator for airplanes, a globe, a non-compressible fluid completely filling said globe, a frame inclosed by and having pivotal connection with said globe so as to be turnable on a normally horizontal axis, an indicator shaft pivotally connected to said frame and having its axis at right angles to the axis of the frame, a hollow ball at one end of the shaft, and a weight at the other end of the shaft.

2. A balance indicator for airplanes comprising a bracket provided with recesses, a globe having outstanding projections rigidly received within said recesses, a frame normally horizontally pivoted in said globe so as to be turnable on a normally horizontal axis, a calibrated ring normally held in a vertical position by said frame, and an indicator shaft pivoted to said frame and having an indicator coöperating with the calibrations on the ring.

3. In a balance indicator for airplanes, a globe, an non-compressible fluid completely filling said globe, a frame inclosed by and having pivotal connection with said globe so as to be turnable on a horizontal axis, an indicator shaft pivotally connected to said frame and having its axis at right angles to the axis of the frame, a hollow float ball at the top of the shaft, and a smaller ball at the other end of the shaft whereby the hollow float ball will maintain the shaft in vertical position.

4. In a balance indicator for airplanes, a globe, a non-compressible fluid completely filling said globe, a frame inclosed by and having pivotal connection with said globe so as to be turnable on a normally horizontal axis, an indicator shaft pivotally connected to the center of said frame and having its axis at right angles to the axis of the frame, and a hollow float ball at the upper end of said shaft.

5. In a balance indicator for airplanes, a globe, a non-compressible fluid completely filling said globe, a frame inclosed by and having pivotal connection with said globe so as to be turnable on a normally horizontal axis, said frame comprising two spaced bars, each bar being curved outwardly near its respective ends whereby the complementary turned-out portions on the ends of the bars provide open loops, an indicator shaft pivotally connected to said frame between the bars and having a float ball at one end of less diameter than the diameter of the loops, and a weight at the other end of the shaft.

6. In a balance indicator for airplanes, a bracket provided with recesses, a globe having outstanding projections rigidly received within said recesses, a frame normally horizontally pivoted in said globe so as to be turnable on a normally horizontal axis, a calibrated ring held in a vertical position by said frame, an indicator shaft pivotally connected to said frame having an indicator coöperating with the calibrations on the ring, and a float at the upper end of said shaft.

In testimony whereof I affix my signature.

WILLIAM B. CUNNINGHAM.